United States Patent
Prociw

(10) Patent No.: US 10,125,695 B2
(45) Date of Patent: Nov. 13, 2018

(54) AUTOMATIC CONTROL OF TURBINE BLADE TEMPERATURE DURING GAS TURBINE ENGINE OPERATION

(71) Applicant: United Technologies Corporation, Farmington, CT (US)

(72) Inventor: Lev Alexander Prociw, Johnson, IA (US)

(73) Assignee: United Technologies Corporation, Farmington, CT (US)

( * ) Notice: Subject to any disclaimer, the term of this patent is extended or adjusted under 35 U.S.C. 154(b) by 350 days.

(21) Appl. No.: 15/025,941

(22) PCT Filed: Sep. 17, 2014

(86) PCT No.: PCT/US2014/056027
§ 371 (c)(1),
(2) Date: Mar. 30, 2016

(87) PCT Pub. No.: WO2015/060956
PCT Pub. Date: Apr. 30, 2015

(65) Prior Publication Data
US 2016/0245187 A1 Aug. 25, 2016

Related U.S. Application Data

(60) Provisional application No. 61/886,887, filed on Oct. 4, 2013.

(51) Int. Cl.
*F02C 9/26* (2006.01)
*F02C 9/28* (2006.01)
(Continued)

(52) U.S. Cl.
CPC ............... *F02C 9/28* (2013.01); *F01D 5/02* (2013.01); *F01D 5/12* (2013.01); *F01D 21/003* (2013.01);
(Continued)

(58) Field of Classification Search
CPC .. F02C 9/28; F02C 9/26; F01D 21/003; F01D 21/12; F23R 3/28; F05D 2270/303; F23N 2041/20
See application file for complete search history.

(56) References Cited

U.S. PATENT DOCUMENTS 4,967,552 A 11/1990 Kumata et al.
5,252,860 A * 10/1993 McCarty ............... F02C 9/28
290/40 R
(Continued)

OTHER PUBLICATIONS

International Search Report and Written Opinion for International Application No. PCT/US2014/056027 dated Jun. 26, 2015.
(Continued)

*Primary Examiner* — Steven Sutherland
(74) *Attorney, Agent, or Firm* — Carlson, Gaskey & Olds, P.C.

(57) ABSTRACT

A method of controlling an airfoil component temperature distribution includes the steps of detecting an airfoil component temperature, comparing the detected airfoil component temperature to a desired airfoil component temperature profile, and controlling a fuel flow in response to the comparing step to maintain the airfoil component temperature within the desired airfoil component temperature profile.

19 Claims, 3 Drawing Sheets

(51) Int. Cl.
  *F01D 21/12* (2006.01)
  *F01D 5/02* (2006.01)
  *F01D 5/12* (2006.01)
  *F01D 21/00* (2006.01)
  *F02C 3/14* (2006.01)
  *F23R 3/28* (2006.01)

(52) U.S. Cl.
  CPC ............... *F01D 21/12* (2013.01); *F02C 3/14* (2013.01); *F02C 9/26* (2013.01); *F23R 3/28* (2013.01); *F05D 2220/32* (2013.01); *F05D 2240/35* (2013.01); *F05D 2270/303* (2013.01); *F23N 2041/20* (2013.01)

(56) References Cited

U.S. PATENT DOCUMENTS

| | | | |
|---|---|---|---|
| 5,327,718 A * | 7/1994 | Iwata | F02C 7/228 60/39.27 |
| 5,457,953 A | 10/1995 | Etheridge | |
| 5,862,668 A | 1/1999 | Richardson | |
| 6,135,760 A | 10/2000 | Cusack et al. | |
| 6,397,602 B2 | 6/2002 | Vandervort et al. | |
| 6,983,603 B2 | 1/2006 | Macchia | |
| 8,504,276 B2 | 8/2013 | Martling et al. | |
| 2002/0149485 A1 | 10/2002 | Nagata et al. | |
| 2004/0055273 A1* | 3/2004 | Hirayama | F02C 9/28 60/39.281 |
| 2007/0125090 A1 | 6/2007 | Martis et al. | |
| 2009/0288416 A1* | 11/2009 | Matsumoto | F01D 19/02 60/646 |
| 2010/0236251 A1 | 9/2010 | Hein et al. | |
| 2010/0300062 A1* | 12/2010 | Ewens | F01D 17/08 60/39.24 |
| 2011/0239657 A1 | 10/2011 | Tate | |
| 2012/0002035 A1* | 1/2012 | Li | F01D 17/085 348/82 |
| 2013/0091855 A1 | 4/2013 | Race | |

OTHER PUBLICATIONS

The International Preliminary Report on Patentability for PCT Application No. PCT/US2014/056027, dated Apr. 14, 2016.

* cited by examiner

AUTOMATIC CONTROL OF TURBINE BLADE TEMPERATURE DURING GAS TURBINE ENGINE OPERATION

CROSS-REFERENCE TO RELATED APPLICATIONS

This application claims priority to U.S. Provisional Application No. 61/886,887, which was filed on Oct. 4, 2013, and is incorporated herein by reference.

BACKGROUND

This disclosure relates to a gas turbine engine airfoil component temperature control system and method used during engine operation.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

The radial temperature distribution of the high pressure turbine of any gas turbine engine is important in determining the life of the turbine. The stress and creep experienced by the blade is determined by the radial forces due to rotation and the radial temperature distribution on the turbine blade, particularly at high power conditions. The exact gas temperature distribution exiting the combustor and heating the turbine blades is extremely difficult to ascertain exactly and under all conditions. The blades are difficult to instrument because they are rotating. Gas temperatures in modern turbines can exceed the melting temperature of nearly all metallic materials. As such, the temperature is estimated from measurements conducted in rig tests and with computational methods. Any measurements that can be made (such as paint discoloration tests) are indicative of peak average temperature. These measurements are indicative of a particular set of hardware which was used for the test. It cannot predict the exact temperature for all combinations of hardware that are assembled in production, and, as such, safety factors must be applied to limit the maximum gas temperature to be used in production. The low allowable temperature results in reduced engine fuel efficiency.

Radial temperature profiles are developed as part of combustor development programs where combustor air flow distribution is designed to produce a radial temperature distribution necessitated by the turbine stress limitations. The success of the combustor design is again limited to the degree to which the gas temperatures actually convert to turbine blade temperatures with the individual cooling schemes, the degree to which the combustor and fuel nozzle hardware are representative of the future production field, and to the extent that static temperature field measurements are indicative of transient distributions found in the field with different degrees of hardware deterioration.

SUMMARY

In one exemplary embodiment, a method of controlling an airfoil component temperature distribution includes the steps of detecting an airfoil component temperature, comparing the detected airfoil component temperature to a desired airfoil component temperature profile, and controlling a fuel flow in response to the comparing step to maintain the airfoil component temperature within the desired airfoil component temperature profile.

In a further embodiment of the above, the airfoil component is a turbine blade.

In a further embodiment of any of the above, the method of controlling an airfoil component temperature distribution includes a step of aiming a sensor at the turbine blade to detect the airfoil component temperature.

In a further embodiment of any of the above, the sensor is an infrared sensor.

In a further embodiment of any of the above, the sensor is arranged on a side of the turbine blade opposite a combustor section.

In a further embodiment of any of the above, the method of controlling an airfoil component temperature distribution includes the step of regulating multiple control valves to multiple fuel injectors to control the fuel flow.

In a further embodiment of any of the above, the injectors are arranged in multiple annular rows.

In a further embodiment of any of the above, the detected airfoil component temperature corresponds to a radial length of the turbine blade.

In a further embodiment of any of the above, the detected airfoil temperature is a discrete location on the turbine blade.

In a further embodiment of any of the above, the controlling step includes leaning the fuel flow at a radial position of the combustor to lower the temperature of the airfoil component on a corresponding radial position of the airfoil component.

In another exemplary embodiment, a system for controlling a turbine blade temperature distribution includes a combustor section with injectors, a fuel control configured to selectively provide fuel to the injectors, a turbine section with a turbine blade, a sensor configured to detect the temperature of the turbine blade, and a controller programmed to communicate with the sensor and compare a detected turbine blade temperature to a desired turbine blade temperature profile. The controller is programmed to command the fuel control to regulate the fuel flow to the injectors in response to the comparison to maintain the turbine blade temperature within the desired turbine blade temperature profile.

In a further embodiment of the above, the sensor is aimed at the turbine blade to detect the turbine blade temperature.

In a further embodiment of any of the above, the sensor is an infrared sensor.

In a further embodiment of any of the above, the sensor is arranged on a side of the turbine blade opposite the combustor section.

In a further embodiment of any of the above, the injectors are arranged in multiple annular rows.

In a further embodiment of any of the above, the detected turbine blade temperature corresponds to a radial length of the turbine blade.

In a further embodiment of any of the above, the detected airfoil temperature is a discrete location on the turbine blade.

In a further embodiment of any of the above, the controller is configured to lean the fuel flow at a radial position of the combustor section to lower the temperature of the turbine blade on a corresponding radial position of the turbine blade.

In a further embodiment of any of the above, a second sensor is configured to detect an engine phenomenon associated with combustion and is in communication with the controller. The engine phenomenon relates to at least one of noise, vibration, flameout, and instability. The controller is programmed to mitigate the engine phenomenon while maintaining the desired turbine blade temperature profile.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
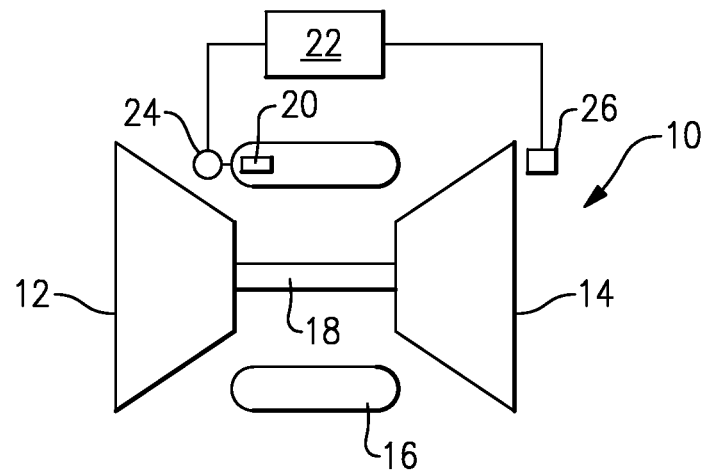
FIG. 1 schematically illustrates a gas turbine engine embodiment.

A gas turbine engine 10 as schematically shown in FIG. 1. The engine 10 includes a compressor section 12 and a turbine section 14 rotatably connected to one another by a spool 18. A combustor section 16 is arranged axially between the compressor and turbine sections 12, 14. The engine 10 is highly schematic and for illustration purposes only. The engine 10 may include multiple spools and may also include a fan section or an augmenter section. The engine 10 also be a commercial engine, industrial engine or military engine.

Fuel is supplied to the combustor section 16 through multiple injectors 20. The amount of fuel delivered by the injector 20 to the combustor section 16 is regulated by a fuel divider and control valve 24 as commanded by a controller 22. A sensor 26 is arranged in the turbine section 14 and is in communication with the controller 22.

Gas temperatures exiting the combustor section 16 can be much higher than the melting point of any metal. The temperature of the gas is required to limit fuel flow to prevent blade temperature overheating. Rather than attempting to measure the gas temperature to compute the blade temperature, the blade measurements are made directly by non-intrusive means to ensure the blade temperatures are not being exceeded. This reduces the safety margins required by the estimation of blade temperature using conventional means.

Figure 2:
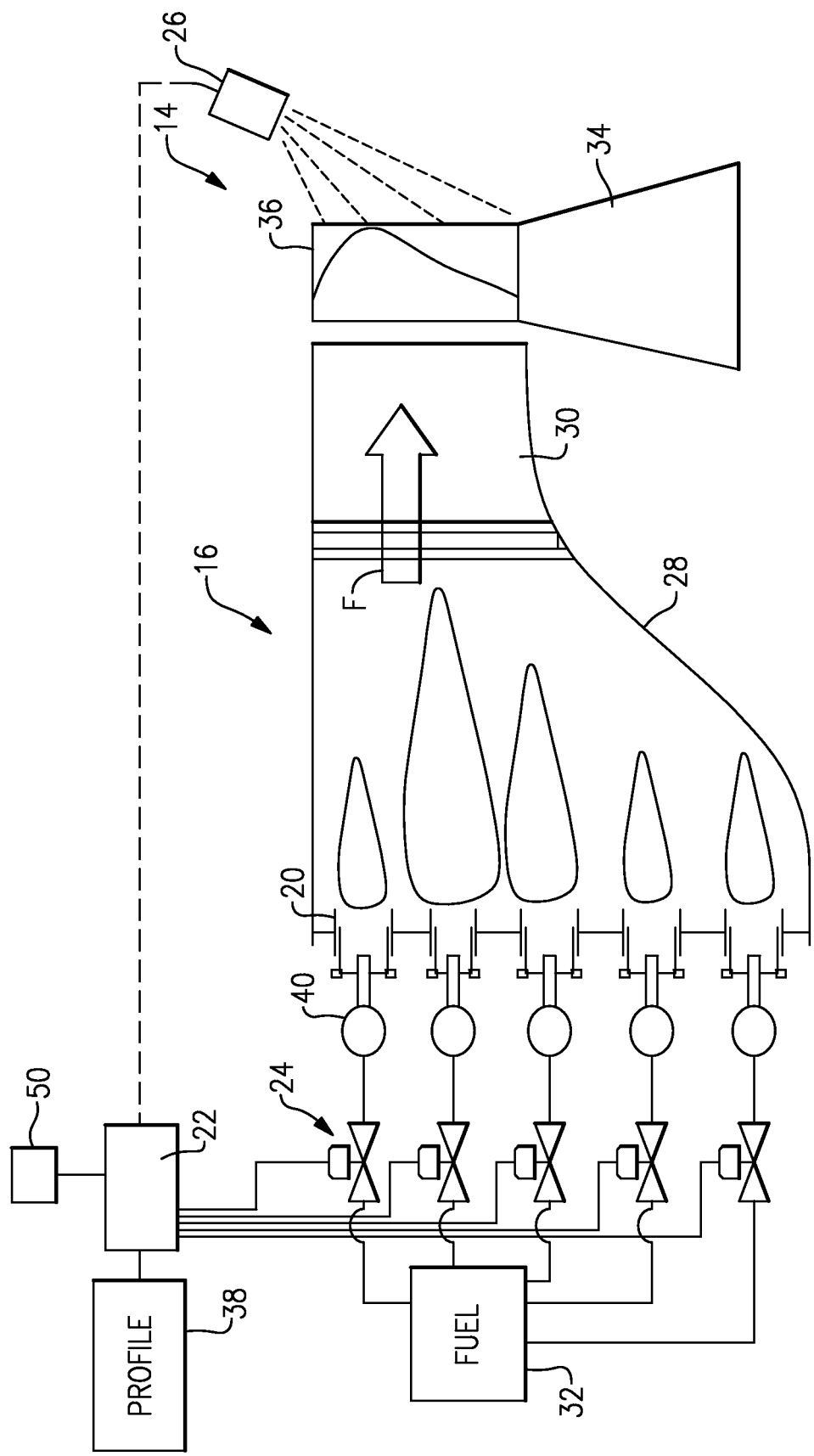
FIG. 2 is a schematic view of a combustor section and a turbine section including one disclosed automatic turbine blade temperature control.

Referring to FIG. 2, the combustor section 16 includes a combustor housing 28 having circumferentially spaced apart vanes 30 at a downstream side of the combustor. A fuel source 32 communicates fuel to multiple control valves 24 that regulate the flow of fluid to multiple injectors 20.

In one example, the injectors 20 are spaced radially from one another at an upstream side of the combustor. For example, multiple fuel manifolds are arranged in a radial fashion, and fuel injectors are connected to the manifolds to spray the fuel in a manner that produces a variable gas temperature distribution at the exit of the combustor section 16. A fuel divider valve controlled by the fuel control which is capable of dividing the total fuel flow into a number of radial fuel manifolds as commanded by the controller 22.

The turbine section 14 includes a rotor 34 supporting multiple circumferentially spaced apart turbine blades 36. In one example, the turbine blades 36 are first stage turbine blades arranged in a high pressure turbine section of an engine. These first stage turbine blades experience the hottest temperatures within the engine and tend to be a life limiting part.

In one example, sensor 26 is an infrared camera arranged at a downstream side of the blade 36 opposite the combustor section 16 where the temperatures are somewhat lower than on the combustor side. Multiple sensors may be used. The sensor 26 is directed to the turbine blade 36 to detect a temperature profile on the turbine blade. The sensor may be used to determine if any given blade were too different from the population indicative of cooling issues. The device could also determine the average radial temperature distribution being exhibited by the blades. In one example, the sensor 26 detects the temperature profile along a radial length of the blade 36. In another example, the sensor 26 may detect the temperature at a discrete location. The sensor 26 detects the temperature on the surface of the blade 36 and communicates this detected temperature to the controller 22.

A desired temperature profile for the turbine blade 36 is stored at 38. The controller 22 references the desired temperature profile and compares the detected temperature profile to the desired temperature profile to determine if the blade 36 is different than the desired temperature profile.

During many engine operating conditions, the control valves 24 deliver fuel to the combustor to obtain a predetermined temperature distribution which provides the most efficient use of the fuel. If a hotter than desired temperature is detected on the temperature blade 36, the controller 22 commands the control valve 24 to regulate the fuel flow to maintain the turbine blade temperature within the desired temperature profile. A certain fuel distribution will produce temperature pattern on the turbine blades depending on the fuel to air ratio distribution, the blade coolant temperature, the condition of the turbine hardware and the degree to which the combustor and related hardware meet production standards. The temperatures could be static or transient depending on the engine condition. Reducing the blade temperature may be achieved by leaning the fuel mixture. Since it is the fuel distribution which is manipulated to control blade temperatures, air flows within the engine can be better dedicated to combustion and emissions priorities rather than cooling.

Figure 3:
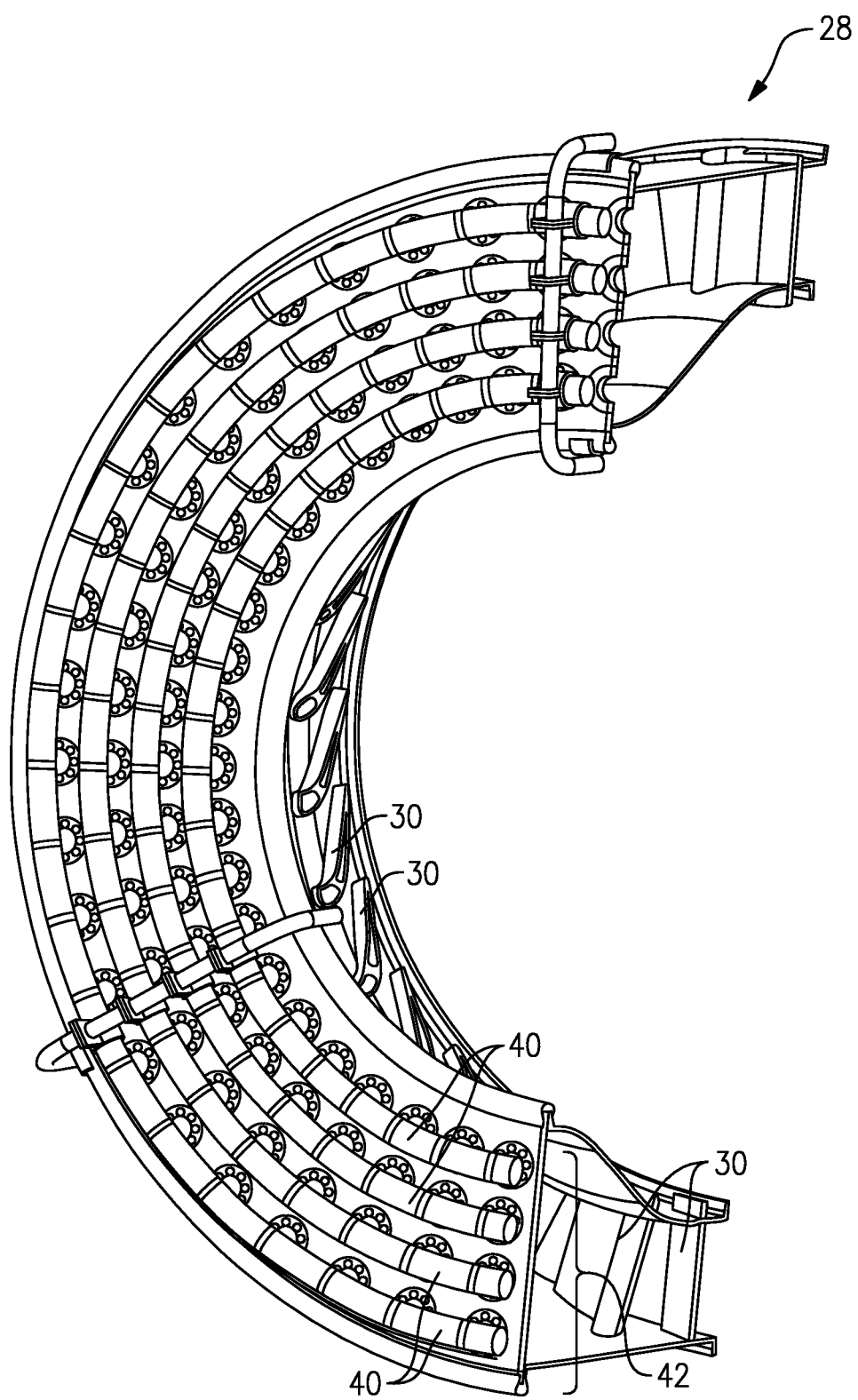
FIG. 3 is a partial perspective view of an example combustor housing.

Referring to FIG. 3, the multiple injectors 20 may be interconnected to one another using multiple fuel manifolds 40 that are arranged in annular rows 42. The rows 42 correspond to radial positions along the turbine blade 36. Thus, for example, if the temperature of the airfoil near the platform becomes too hot, a radially innermost fuel manifold 40 may be leaned out to reduce the temperature at this radial position of the turbine blade. Additionally, it should be understood that the fuel injectors may be regulated to increase the temperature along the turbine blade 36 to ensure that the engine is operating at maximum efficiency.

Figure 4:
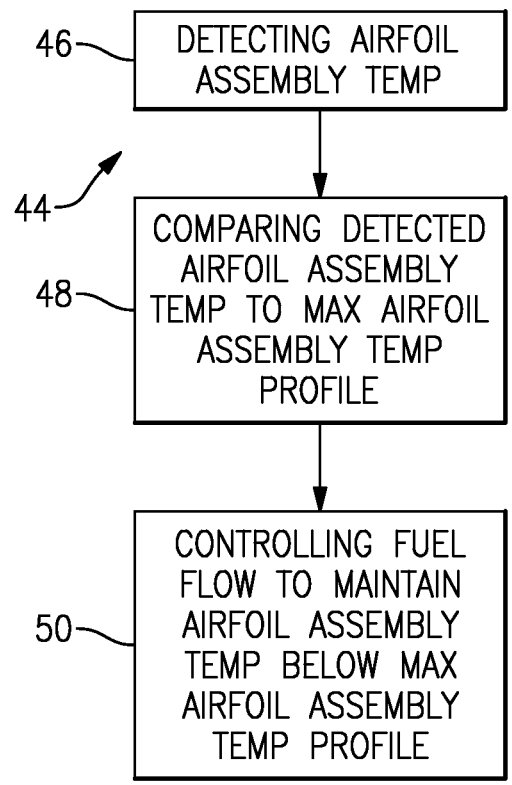
FIG. 4 depicts a method of controlling the turbine blade temperature.

Referring to FIG. 4, a method 44 of controlling a turbine blade temperature distribution includes the step of detecting the airfoil component temperature, as indicated at block 46. The detected airfoil component temperature is compared to the desired airfoil component temperature profile, as indicated at block 48. The fuel flow is adjusted to maintain the airfoil component temperature within a desired airfoil component temperature profile, as indicated at block 50.

Using the feedback from the blade temperatures, fuel flows could be adjusted through software in the fuel control in a customized fashion for any given set of engine hardware. The radial distribution would be exactly right for every engine rather than approximately right based on tests with a single set of hardware.

The system may be used to accommodate transient conditions or to modify the profile depending on the engine condition. For example, a different profile could be used for take-off conditions than that that would be used for cruise. The system may be used to adjust fuel flow to deal with aging deterioration of hardware in the field maintaining the ideal temperature distribution regardless of the condition of the hardware. The system may also be used to control other engine phenomena associated with combustion, which is detected by a sensor 50 in FIG. 2. For example, noise, vibrations, flameout and stability can be controlled in a way that would not jeopardize the life of the blades by mitigating the engine phenomenon by maintaining the desired turbine blade temperature profile. Similarly, emission can be better optimized.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although example embodiments have been disclosed, a worker of ordinary skill in this art would recognize that certain modifications would come within the scope of the claims. For that and other reasons, the following claims should be studied to determine their true scope and content.

What is claimed is:

1. A method of controlling an airfoil component temperature distribution of an airfoil component, comprising:
   a step of detecting an airfoil component temperature;
   a step of comparing the airfoil component temperature to a desired airfoil component temperature profile; and
   controlling a fuel flow in response to the step of comparing to maintain the airfoil component temperature within the desired airfoil component temperature profile.

2. The method according to claim 1, wherein the airfoil component is a turbine blade.

3. The method according to claim 2, comprising a step of aiming a sensor at the turbine blade to detect the airfoil component temperature.

4. The method according to claim 3, wherein the sensor is an infrared sensor.

5. The method according to claim 3, wherein the sensor is arranged on a side of the turbine blade opposite a combustor section.

6. The method according to claim 1, comprising the step of regulating multiple control valves to multiple fuel injectors to control the fuel flow.

7. The method according to claim 6, wherein the multiple fuel injectors are arranged in multiple annular rows.

8. The method according to claim 1, the airfoil component temperature corresponds to a radial length of the airfoil component.

9. The method according to claim 1, wherein the airfoil component temperature is measured at a discrete location on the airfoil component.

10. The method according to claim 1, wherein the step of controlling includes leaning the fuel flow at a radial position of a combustor to lower the airfoil component temperature on a corresponding radial position of the airfoil component.

11. A system for controlling a turbine blade temperature distribution, comprising:
    a combustor section with injectors;
    a fuel control configured to selectively provide a fuel flow to the injectors;
    a turbine section with a turbine blade;
    a sensor configured to detect a turbine blade temperature; and
    a controller programmed to communicate with the sensor and perform a comparison of a detected turbine blade temperature to a desired turbine blade temperature profile, the controller programmed to command the fuel control to regulate the fuel flow to the injectors in response to the comparison to maintain the turbine blade temperature within the desired turbine blade temperature profile.

12. The system according to claim 11, wherein the sensor is aimed at the turbine blade to detect the turbine blade temperature.

13. The system according to claim 12, wherein the sensor is an infrared sensor.

14. The system according to claim 12, wherein the sensor is arranged on a side of the turbine blade opposite the combustor section.

15. The system according to claim 11, wherein the injectors are arranged in multiple annular rows.

16. The system according to claim 11, wherein the detected turbine blade temperature corresponds to a radial length of the turbine blade.

17. The system according to claim 11, wherein the detected turbine blade temperature is measured at a discrete location on the turbine blade.

18. The system according to claim 11, wherein the controller is configured to lean the fuel flow at a radial position of the combustor section to lower the turbine blade temperature on a corresponding radial position of the turbine blade.

19. The system according to claim 11, comprising a second sensor configured to detect an engine phenomenon associated with combustion and in communication with the controller, the engine phenomenon relating to at least one of noise, vibration, flameout, and instability and the controller programmed to mitigate the engine phenomenon while maintaining the desired turbine blade temperature profile.

* * * * *